United States Patent
Said et al.

(10) Patent No.: US 8,064,431 B2
(45) Date of Patent: Nov. 22, 2011

(54) ONE WAY INFORMATION TRANSMISSION METHOD

(75) Inventors: Ronald A. Said, Broken Arrow, OK (US); John S. Jones, Tulsa, OK (US); Sunil M. Gottipati, Broken Arrow, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 160 days.

(21) Appl. No.: 12/502,843

(22) Filed: Jul. 14, 2009

(65) Prior Publication Data
US 2011/0013645 A1    Jan. 20, 2011

(51) Int. Cl.
*H04L 12/28* (2006.01)

(52) U.S. Cl. ...................................... 370/351

(58) Field of Classification Search ............... 370/351, 370/389, 392, 395.2–395.5, 400, 401, 464–468; 709/227–238
See application file for complete search history.

(56) References Cited

U.S. PATENT DOCUMENTS

| | | | |
|---|---|---|---|
| 5,557,608 A | 9/1996 | Calvignac et al. | |
| 5,757,784 A | 5/1998 | Liebowitz et al. | |
| 5,848,415 A * | 12/1998 | Guck | 707/831 |
| 5,905,522 A * | 5/1999 | Lawler | 725/131 |
| 5,974,439 A | 10/1999 | Bollella | |
| 6,446,125 B1 | 9/2002 | Huang et al. | |
| 6,798,756 B1 | 9/2004 | Kosugi | |
| 6,813,270 B1 * | 11/2004 | Oz et al. | 370/394 |
| 6,967,948 B2 | 11/2005 | Iacovino et al. | |
| 6,996,061 B2 | 2/2006 | Yang et al. | |
| 7,130,276 B2 | 10/2006 | Chen et al. | |
| 7,165,252 B1 | 1/2007 | Xu | |
| 7,249,165 B1 * | 7/2007 | Lu et al. | 709/217 |
| 7,252,439 B2 | 8/2007 | Takeuchi et al. | |
| 7,324,750 B2 | 1/2008 | Badt, Jr. | |
| 7,420,989 B2 | 9/2008 | Liu et al. | |
| 7,444,638 B1 | 10/2008 | Xu | |
| 7,522,633 B2 | 4/2009 | Ichino | |
| 7,535,831 B2 | 5/2009 | Phelps et al. | |
| 7,559,073 B2 | 7/2009 | Marler et al. | |
| 7,560,111 B2 | 7/2009 | Kao et al. | |
| 7,573,847 B2 | 8/2009 | Rogers et al. | |
| 7,770,200 B2 * | 8/2010 | Brooks et al. | 725/95 |
| 2006/0206422 A1 * | 9/2006 | Mashinsky | 705/40 |
| 2008/0120552 A1 | 5/2008 | Dagan et al. | |
| 2008/0130627 A1 | 6/2008 | Chen et al. | |
| 2009/0144568 A1 | 6/2009 | Fung | |
| 2010/0189174 A1 * | 7/2010 | Potdar et al. | 375/240.03 |
| 2010/0271951 A1 * | 10/2010 | Dujardin et al. | 370/241 |

OTHER PUBLICATIONS

European Patent Office PCT International Search Report, International Application PCT/US2010/041687, mailed Aug. 31, 2010.
European Patent Office PCT Written Opinion, International Application PCT/US2010/041687, mailed Aug. 31, 2010.

* cited by examiner

*Primary Examiner* — Dmitry H Levitan

(57) ABSTRACT

A method of one way transmission of information is provided. Preferably, the method steps include analyzing customer supplied information to determine a format to be selected, transmission priority, available transmission resources, and transmission destination. The preferred steps also include, determining a media transport method based on the transmission priority, transmission destination, and available transmission resources, and scheduling transmission of an information payload portion of the customer supplied information as a pre-emptible data reservation, based on a determined media transport method. The steps further preferably include, transforming the information payload into a selected format, storing the information payload in its formatted form on a non-volatile storage medium, encapsulating the information payload in its selected format within a media transport format, and transmitting the encapsulated information payload to the transmission destination.

18 Claims, 3 Drawing Sheets

ONE WAY INFORMATION TRANSMISSION METHOD

FIELD OF THE INVENTION

This invention relates to information transmission methods, and in particular, but not by way of limitation, to a one way information transmission method of file based video content information using an Asynchronous Serial Interface (ASI) transmission format.

BACKGROUND

As demands for the transfers of large blocks of information across the information network backbone (including real time transfer of information laden with video content) continue to increase and pricing pressures continue to bear down on service providers more efficient and cost effective methods of information transmission are demanded by the market.

Accordingly, challenges remain and a need persists for improvements in methods and apparatuses for use in accommodating effective and efficient deployment and use of information system networks, information transmission methodologies, and transmission service pricing.

SUMMARY OF THE INVENTION

In accordance with exemplary embodiments, a one way information transmission method is provided. In an exemplary embodiment, the method steps include at least analyzing customer supplied information to determine a format to be selected, transmission priority, available transmission resources, and transmission destination commensurate with the customer supplied information. In an exemplary embodiment, the steps further include determining a media transport method based on the transmission priority, transmission destination, and available transmission resources, scheduling transmission of an information payload portion of the customer supplied information as a pre-emptible data reservation based on a determined media transport method, and transforming the information payload of the customer supplied information into a selected format. A skilled artisan will understand that a reservation embodies pre-scheduling facilities and bandwidth based on the customer's needs for an agreed to future event. The exemplary method additionally includes the steps of storing the information payload in its selected formatted form on a non-volatile storage medium, encapsulating the information payload in its selected format within a media transport format, transmitting the encapsulated information payload to the transmission destination, determining receipt of the encapsulated information payload at the transmission destination, and requesting re-transmission of any missing encapsulated information payload.

In the exemplary embodiment, the format to be selected is determined by the steps of receiving a customer request for a transmission service to transmit customer supplied information, determining whether customer supplied information is file based or video stream based information, advising the customer of available compression facilities consistent with the customer supplied information, discerning whether the customer selected a compression facility from the available compression facilities, and linking the selected compression facility to the customer supplied information.

To assure the customer's transmission service needs are identified and carried out, the exemplary method also included the steps of determining whether the information payload is presented in a compressible format, ascertaining a file size of information payload, identifying a required delivery time for the information payload, establish a service priority based on the file size and requested delivery time, confirming an availability of transport facilities, and supplying a price to the customer for transmission service options.

In an exemplary embodiment, the price includes at least a price quote for an earliest in time transmission of the information payload in the compressible format, a price quote for a delayed in time transmission of the information payload in the compressible format, a price quote for an earliest in time transmission of the information payload in a compressed format, and a price for a delayed in time transmission of the information payload in a compressed format.

In an exemplary embodiment, once the final format and delivery instructions have been received from the customer, based on supplied price, the transmission service is preformed and conformation of the transmission is provided to the customer. However, prior to transmission of the information payload, the scheduling step of an exemplary embodiment includes the steps of analyzing the customer supplied information to determine an applicability of a pre-emptible data reservation to the information payload, advising the customer of the availability of pre-emptible data reservations, associating a pre-emptible data reservation with the information payload consistent with the customer selected pre-emptible data reservation, scheduling transmission of the information payload based on availability of transmission resources, and rescheduling transmission of the information payload when a non-pre-emptible information payload preempts the pre-emptible information payload.

These and various other features and advantages that characterize the claimed invention will be apparent upon reading the following detailed description and upon review of the associated drawings.

DETAILED DESCRIPTION OF A PREFERRED EMBODIMENT

Detailed descriptions of exemplary embodiments are provided herein. It is to be understood, however, that the invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
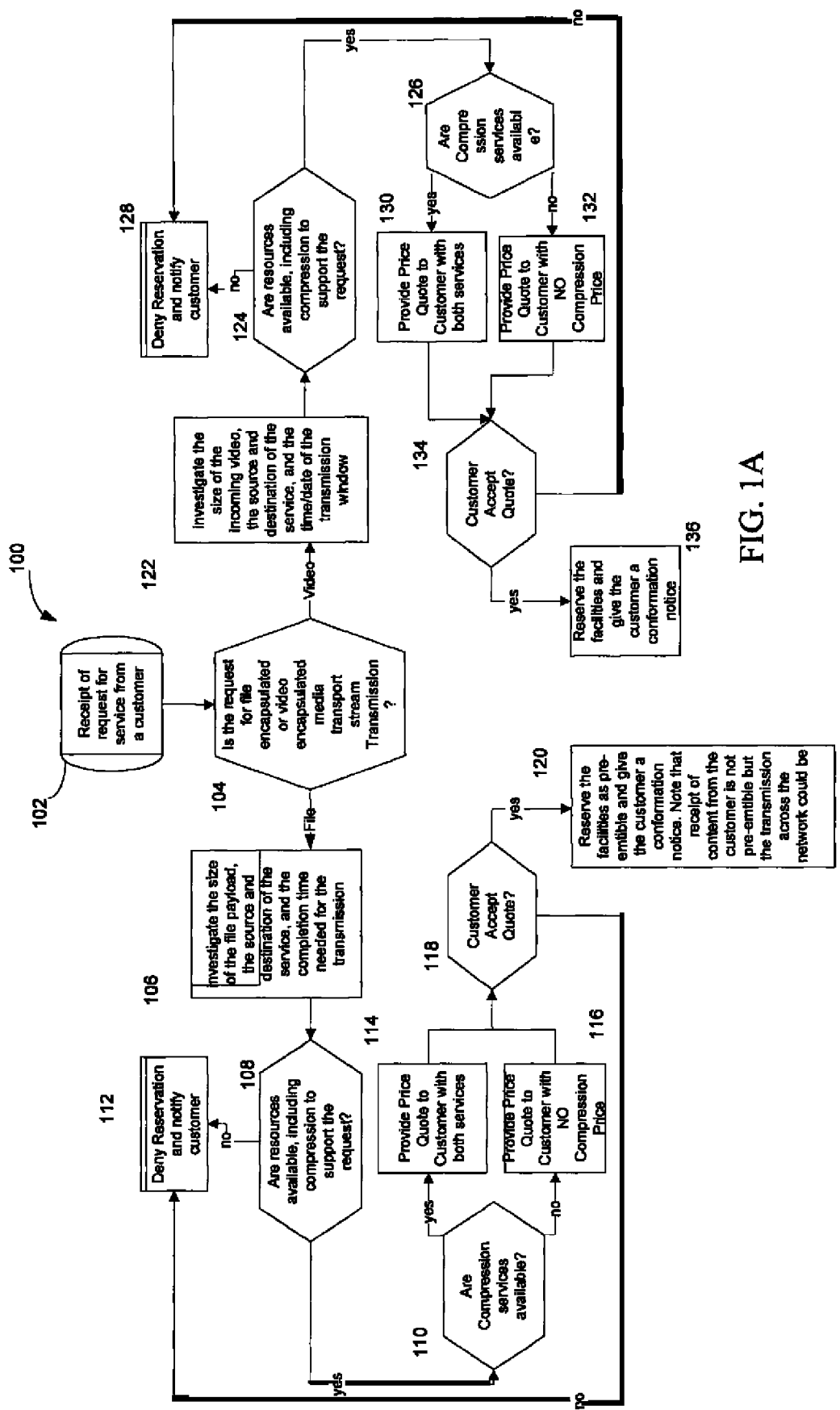
FIG. 1A shows a first portion (the reservation of the facilities for the payload) of a flowchart of using an inventive one way information transmission method.

Reference will now be made in detail to one or more exemplary embodiments of the invention, as those embodiments are depicted in the figures. Each example is provided by way of explanation of the invention, and not meant as a limitation of the invention. FIG. 1A shows a exemplary embodiment of an inventive one way transmission method 100 that preferably commences with receipt of a customer request for service, including a request for transmission of the information payload portion of the customer supplied information. In the exemplary embodiment, the customer service request is received via a network access unit at process step 102.

At process step 104, the received information is evaluated to determine whether the request is for file encapsulated or video encapsulated media transport stream transmission. In the exemplary embodiment, both transmissions will use a media stream, such as Digital Video Broadcasting (DVB) ASI, for transmission, but file encapsulated will encapsulate the file into a media stream, while video encapsulation will encapsulate the video into a media stream. When the request is for the content to be file encapsulated, the process proceeds to process step 106. At process step 106, an investigation is made regarding the size of the file payload, the source and destination availability, and the completion time needed for the transmission. With that information in hand the exemplary process proceeds to process step 108. At 108, If the requested source or destination is not available, or the requested delivery time cannot be achieved, or the transmission resources are unavailable either to meet the requested time of delivery, or the window for transmission is too short for the file size for delivery to the requested destination within the requested time, the process proceeds to process step 112, and the customer is notified of a reservation denial and the reason for the denial. However, if the requested source and destination, delivery time, and transmission resources are available for the file size, the process proceeds to process step 110. At process step of 110, resources are checked to see if compression services are available. If compression services are available the process proceeds to step 114 where a Price is provided to the customer for file transfer as compressed or uncompressed. If compression services are not available the process proceeds to step 116 where a Price is provided to the customer for file transfer with no compression. Once the price has been given to the customer the process proceeds to process step 118 where the customer decides to accept the Price quote or not. If the customer does not accept the price quote the process reverts to process step 112 and the reservation is denied. If however, the customer accepts the Price quote the process proceeds to process step 120 where the network facilities are reserved, but can be preempted, and the customer is given a confirmation notice of the upcoming transmission. In this service, receiving the customer's payload, at the pre-arranged time, will not be delayed or interrupted by other services, but transferring across the network could be delayed.

Referring to process step 104 of the exemplary process, when the request is for the content to be video encapsulated, the process proceeds to process step 122. At process step 122, an investigation is made regarding the size of the video payload, the source and destination availability, and the time/date of the transmission window. With that information in hand the process proceeds to process step 124. At 124, if the requested source or destination is not available, or the requested time/date delivery window is not available, or the transmission resources are unavailable to carry that size of the video, or with the video compressed, the process proceeds to process step 128, and the customer is notified of a reservation denial and the reason for the denial. However, if the requested source and destination, delivery time, and transmission resources are available for the video payload, the exemplary process proceeds to process step 126. At process step of 126, resources are checked to see if compression services are available. If compression services are available the process proceeds to process step 130 where a Price is provided to the customer for video transmission as compressed or uncompressed. If compression services are not available the process proceeds to process step 132 where a Price is provided to the customer for video transmission with no compression. Once the price has been given to the customer the process progresses to process step 134, where the customer decides to accept the Price quote or not. If the customer does not accept the price quote to process reverts to step 128 and the reservation is denied. If however, the customer accepts the Price quote the process proceeds to process step 136 where the network facilities are reserved, and the customer is given a confirmation notice of the upcoming transmission.

Figure 1B:
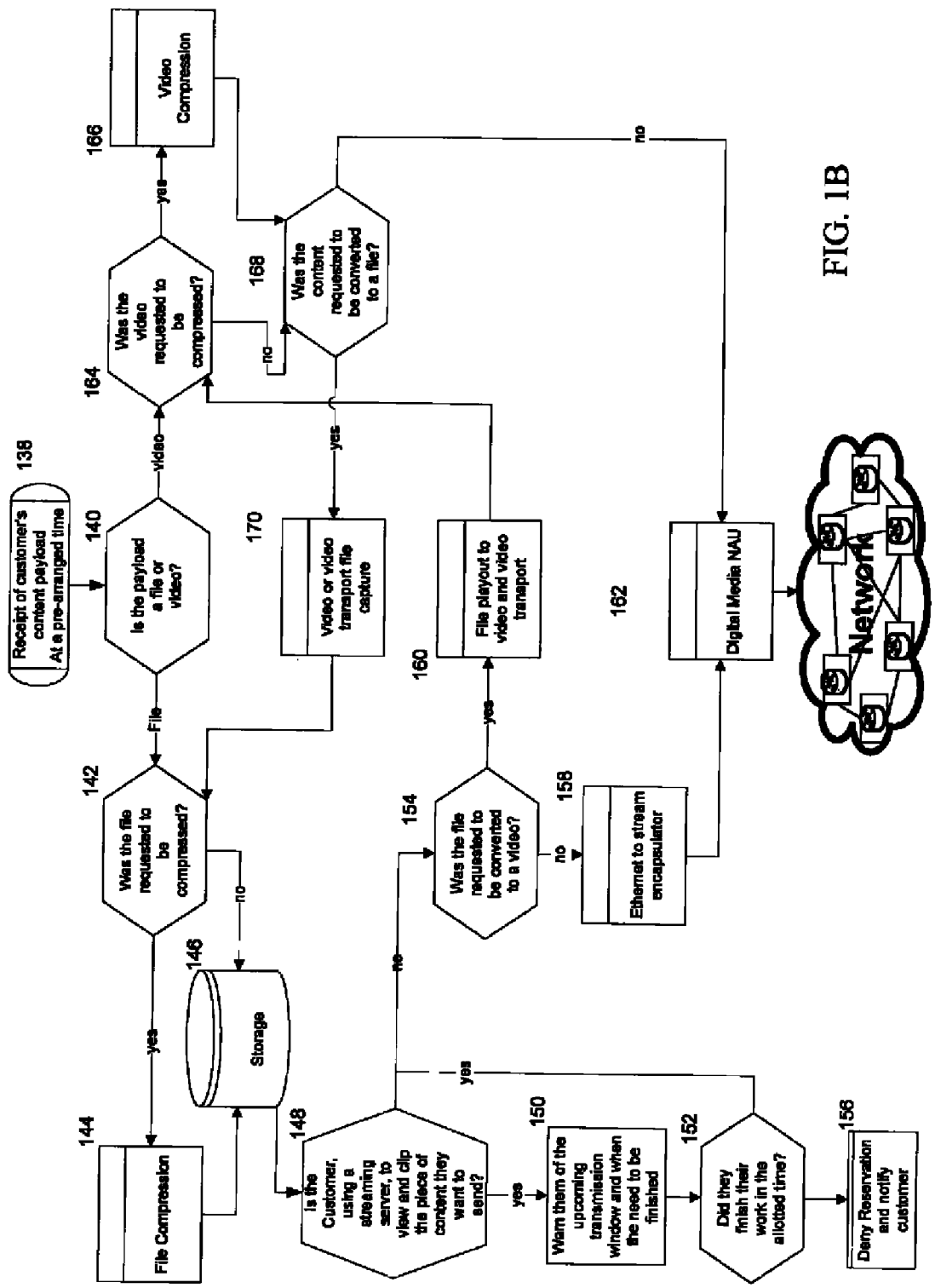
FIG. 1B shows a second portion (the movement of the payload) of the flowchart of using the inventive one way information transmission method of FIG. 1A.
Figure 1C:
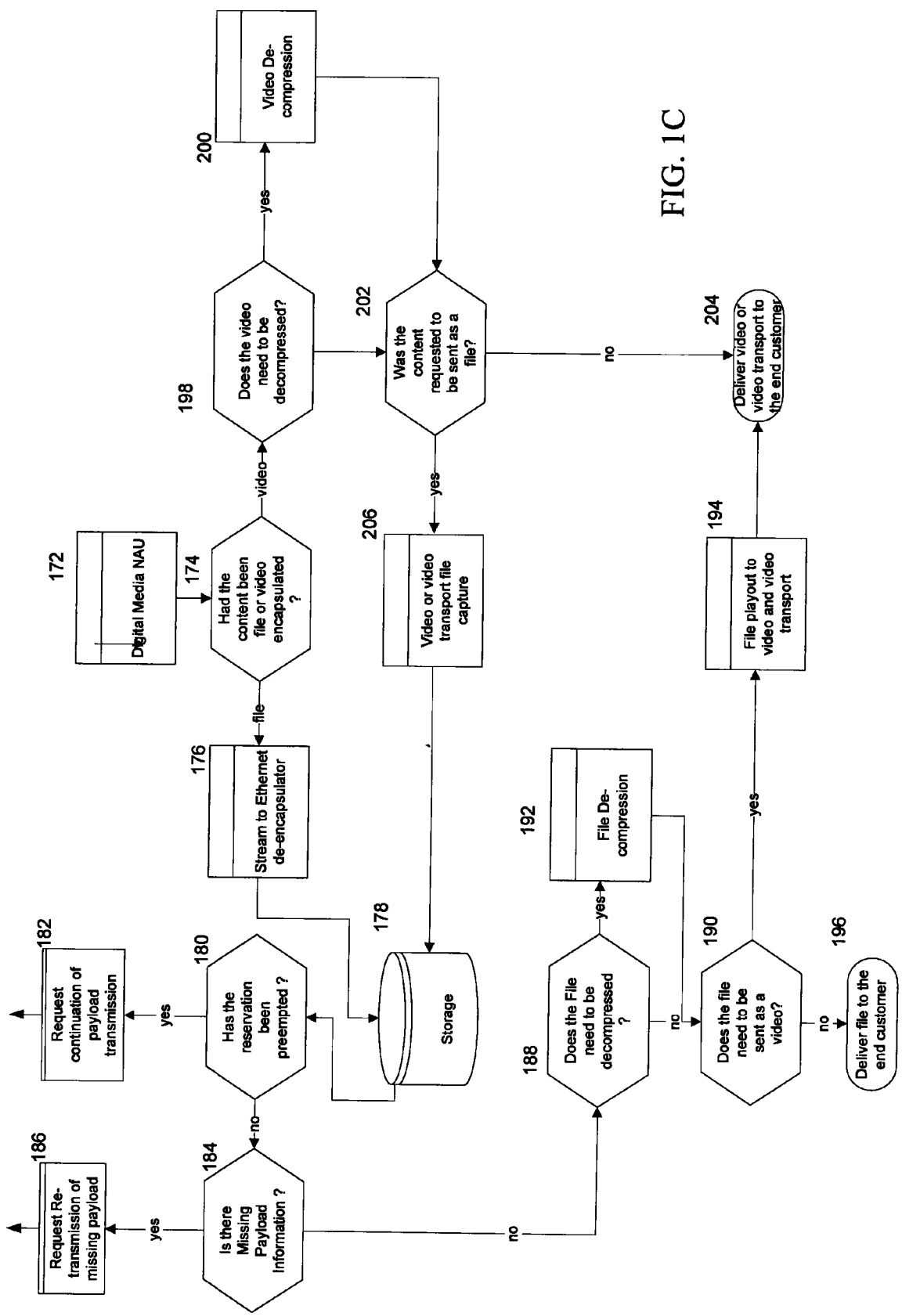
FIG. 1C shows a third portion (the movement of the payload) of the flowchart of using the inventive one way information transmission method of FIGS. 1A and 1B.

If the service has been agreed to and the facilities booked for the services, then, in FIGS. 1B and 1C, the next step is process step 138, where at a pre-arranged time, the customer's content payload is received, the routing of the payload begins and the exemplary process progresses to step 140. At 140, if the payload handed off is a file, the process advances forward to step 142. At 142, the customer's requirement is examined to see if compression service was requested and arranged. If arrangements were made for file compression services then the process advances to process step 144. At 144, the file is compressed and moved on to file storage at process step 146. However, if compression services were not requested, the exemplary process proceeds to process step 142 directly to storage at step 146. Up to this stage the payload has been processed directly, with no delay or interruption. After the file has been stored, it is made available for the customer to manipulate during process step 148. At 148, the customer can use a streaming server to view, clip or manipulate any piece of content before it is released for transmission. The customer can work with their file up until a predetermined time where the file needs to be prepared for transmission. At process step 148, the system monitors the customer's activities and determines if the customer is working on the content. If the customer is working on the content, the process diverts to process step 150 where the customer will be warned of the upcoming transmission window and when they need to discontinue their manipulation task. Following process step 150, the process proceeds to process step 152 where it is determined if the customer completed their file manipulation. If the customer was still manipulating the file once the transmission window time had arrived the exemplary process proceeds to process step 156. At 156, since the customer was not ready for the transmission, the customer is denied the reservation of facilities, the facilities are made available for other services, and the customer is notified that the file transfer has been denied since they were still manipulating the file.

However, if at process step 152, the customer has completed their work, the exemplary process moves to process step 154, which is the start of the transmission window and the file transfer commences.

If at process step 148 the customer was not working with their file once the transmission window arrived, the process proceeds directly to process step 154. At process step 154, a determination is made whether a request to convert the file to a video file is present. If the file was not requested to be changed to a video, the process advances to process step 158, where the file is encapsulated into a media stream. After the file has been encapsulated, the file is transferred into the Digital Media Network Adaptor Unit at process step 162, and the payload has a transport wrapper applied and then sent out onto the transport network. This payload will be transported across the transmission network as a file encapsulated media transport stream that can be pre-empted by other content that is non-pre-emptible and is vying for the same facility at the same time.

If at process step 154, the file was requested to be converted to a video, the process diverts to process step 160. At process step 160, the file would be played out to either become a video stream or a video transport stream. After process step 160 has been completed, the process would proceed to process step 164, taking it through the video transmission preparation process steps.

Referring to process step 140, if the payload handed off is a video, the process advances to process step 164. At process step 164, the process determines if a request was made and facilities were arranged for the video to be compressed. If facilities were arranged for video compression then the process proceeds to process step 166. At process step 166, the video is compressed and the process proceeds to process step 168. If at process step 164 there was no request for video compression then the process would proceed directly to process step 168. At process step 168, the process determines if there was a request for the content to be converted to a file. If the content was requested to be turned into a file the process diverts to process step 170. At process step 170, the video or video stream will be captured and changed into a file format. However, if there was no request for the content to be converted to a file at process step 168, then the process proceeds to process step 162. At process step 162, the content would be moved into the Digital Media Network Adaptor Unit, the payload has a transport wrapper applied, and is sent out onto the transport network. This payload will be transported across the transmission network as a non-pre-emptible video encapsulated media transport stream.

After the payload has moved through the transport network the process continues at process step 172. At process step 172, the payload moves through the Digital Media Network Adaptor Unit where the payload has the transport layer removed and the payload is advanced to process step 174. At process step 174, the process determines if the content had been file encapsulated or video encapsulated. If the content had been file encapsulated, the process proceeds to process step 176 where the content is passed through a stream to Ethernet de-encapsulator. At process step 178, the now Ethernet payload is placed into storage. Once in storage the process analyzes the content and proceeds to process step 180. At process step 180, the process determines if the file had been pre-empted and that the transmission had been terminated before completion. If the file had been pre-empted the process moves to process step 182. At process step 182, a request is made to the control system for a continuation of the payload transmission. The process would revert to process step 146, where the file is kept, determine where the file was pre-empted and set up a reservation to allow the continuation of the file transfer to continue. The process would then advance forward from step 146 as it did before, but now with the remainder of the file. However, if in process step 180, it is determined that the file had not been pre-empted, the process continues at process step 184. At process step 184, the process determines if there are any missing payload information. If it is determined that there is missing payload information then the process advances to process step 186. At process step 186, a request is made to the control system for a retransmission of the missing or corrupt payload, and the process reverts to process step 146, where the file is kept, determine what payload information is needed and set up a reservation to allow the completion of the file transfer. The process would start moving forward from step 146 as it did before, but now with the remainder of the file.

However, if at process step 184, it is determined that the file had all the required payload information then the process continues to process step 188. At process step 188 the process determines, based on the requirements of the customer, if the file needs to be decompressed. If the file needs to be decompressed the process moves to process step 192, where the file is decompressed. After file decompression the process moves onto process step 190. If the file did not need to be decompressed, the process would move the file directly to process step 190 from process step 184.

At process step 190, the process determines, based on the requirements of the customer, if the file needs to be delivered as a video. If the file needs to be delivered as video, the process moves to process step 194. At process step 194, the file is played out to either a video or video transport stream. After process step 194, the process moves forward to process step 204 where the video or video transport is delivered to the end customer. At process step 190, if the video does not need to be delivered as a video then the process moves forward to process step 196, where the file is delivered to the end customer.

Reverting to process step 174, if the content had been video encapsulated then the process proceeds to process step 198. At process step 198, the process determines if the video needs to be decompressed. If the video needs to be decompressed the process advances to process step 200. At process step 200, the video is decompressed and the process moves to process step 202. If at process step 198 it is determined that the video does not need to be decompressed then the process proceeds directly to process step 202. At process step 202 the process determines if the customer requested that the content be sent as a file. If it is determined that the content needs to be sent as a file then the process advances to process step 206. At process step 206, the video or video transport is captured to a file and the content is moved to storage at step 178. Once in storage, it follows the same process listed above.

However, if in step 202, the customer did not request the media content to be sent as a file, then the process proceeds to process step 204. At process step 204, the video or video transport is delivered to the end customer.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of steps within the principles of the invention, to the full extent indicated by the broad general meaning of the terms in which the appended claims are expressed.

What is claimed is:

1. A method of transmission of information by steps comprising:

analyzing customer supplied information received by way of a network access unit to determine from the customer supplied information a format to be selected, transmission priority, available transmission resources, and transmission destination;

determining a media transport method based on the transmission priority, transmission destination, and available transmission resources;

scheduling transmission of an information payload portion of the customer supplied information as a preemptible data, based on a determined media transport method;

determining whether the information payload is presented in a compressible format;

ascertaining a file size of information payload;

identifying a required delivery time for the information payload;

establish a service priority based on the file size and requested delivery time;
confirming an availability of transport facilities;
supplying a price quote matrix to the customer for transmission service options;
transforming the information payload of the customer supplied information into a selected format;
storing the information payload in its selected formatted form on a non-volatile storage medium;
encapsulating the information payload in its selected format within a media transport format;
transmitting the encapsulated information payload to the transmission destination;
determining receipt of the encapsulated information payload at the transmission destination; and
requesting re-transmission of any missing encapsulated information payload.

2. The method of claim 1, in which determining a format to be selected comprises the steps of:
receiving a customer request for a transmission service to transmit customer supplied information;
determining whether customer supplied information is video based information;
advising the customer of available compression facilities consistent with the customer supplied information;
discerning whether the customer selected a compression facility from the available compression facilities; and
linking the selected compression facility to the customer supplied information.

3. The method of claim 1, in which the information payload is presented in a compressible format, the price quote matrix comprising:
a price quote for an earliest in time transmission of the information payload in the compressible format;
a price quote for a delayed in time transmission of the information payload in the compressible format;
a price quote for an earliest in time transmission of the information payload in a compressed format; and
a price quote for a delayed in time transmission of the information payload in a compressed format.

4. The method of claim 3, in which the delayed in time transmission is a plurality of delayed in time transmission times.

5. The method of claim 4, by steps further comprising:
receiving final format in delivery instructions from the customer based on supplied price matrix; and
confirming to the customer the completion of the transmission of the information payload.

6. The method of claim 1, in which the transforming step comprises the steps of:
transforming the information payload into a file packet format when the information payload is in a streamed format; and
storing the transformed information payload in a non-volatile storage medium.

7. The method of claim 1, in which the encapsulating step comprises the steps of:
identifying header information;
associating the identified header with the information payload; and
encapsulating the identified header and information payload within the media transport format.

8. The method of claim 1, in which the scheduling step comprises the steps of:
analyzing the customer supplied information to determine an applicability of a pre-emptible data reservation to the information payload;
advising the customer of the availability of pre-emptible data reservations;
associating a pre-emptible data reservation with the information payload consistent with the customer selected pre-emptible data reservation;
scheduling transmission of the information payload based on availability of transmission resources; and
rescheduling transmission of the information payload when a non-pre-emptible information payload preempts the pre-emptible information payload.

9. The method of claim 1, in which the transmitting step comprises the steps of:
confirming availability of the transmission resources; and
transmitting the information payload to the determined transmission destination.

10. The method of claim 9, in which transmission resource is selected from a group consisting of wireless and wire line facilities.

11. The method of claim 1, in which the determining receipt of the encapsulated information payload comprises the steps of:
comparing the received encapsulated information payload with an expected encapsulated information payload; and
identifying encapsulated information payloads absent from the expected encapsulated information payloads.

12. The method of claim 11, in which the requesting retransmission step comprises the steps of:
requesting retransmission of absent encapsulated information payloads when said encapsulated information payloads are identified as being absent;
retransmitting said identified absent encapsulated information payloads; and
acknowledging receipt by the transmission destination of the identified absent encapsulated information payloads; else acknowledging receipt by the transmission destination of the encapsulated information payloads when the received encapsulated information payloads match the expected encapsulated information payloads.

13. The method of claim 1, in which determining a format comprises the steps of:
receiving a customer request for a transmission service to transmit the information payload;
determining whether the information payload is file based information;
advising the customer of available compression facilities consistent with the information payload;
discerning whether the customer selected a compression facility from the available compression facilities; and
linking the selected compression facility to the information payload.

14. The method of claim 1, in which determining a transmission destination for the information payload comprising the steps of:
analyzing the information payload;
advising the customer of available transmission destinations consistent with the information payload;
discerning a transmission destination selected by the customer from the available transmission destinations; and
linking the selected transmission destination to the information payload.

15. The method of claim 1, in which determining available transmission resources comprising the steps of:
analyzing the information payload;
identifying resources capable of transmitting the information payload;

advising the customer of available destinations for the information payload based on the identified capable resources;

discerning a transmission destination selected by the customer from the advised available transmission destinations; and associating the selected destination to the information payload.

16. The method of claim 1, in which the customer supplied information comprises service order and metrics associated with the information payload.

17. A method of transmission of information by steps comprising:

analyzing customer supplied information received by way of a network access unit to determine from the customer supplied information a format to be selected, transmission priority, available transmission resources, and transmission destination;

determining a media transport method based on the transmission priority, transmission destination, and available transmission resources;

scheduling transmission of an information payload portion of the customer supplied information as a preemptible data, based on a determined media transport method;

transforming the information payload of the customer supplied information into a selected format;

storing the information payload in its selected formatted form on a non-volatile storage medium;

encapsulating the information payload in its selected format within a media transport format;

transmitting the encapsulated information payload to the transmission destination;

determining receipt of the encapsulated information payload at the transmission destination; and requesting re-transmission of any missing encapsulated information payload;

in which determining a transmission priority comprises the steps of:

receiving from a customer a request for a transmission service to transmit the information payload;

providing a plurality of available transmission priority levels;

advising the customer of available transmission priority levels for the requested transmission service based on the information payload;

supplying a price to the customer based on the available transmission priority levels;

discerning the transmission priority level selected by the customer; and linking the selected transmission priority level to the information payload;

in which the price comprises:

a cost associated with each of the available transmission priority levels for transmission of the information payload in a compressible format; and a cost associated with each of the available transmission priority levels for transmission of the information payload in a compressed format.

18. The method of claim 17, in which the cost associative each of the available transmission party levels for transmission of the information payload in a compressed format includes a cost of compressing the information payload in to a compressed format when said information payload is presented in a compressible format.

* * * * *